United States Patent [19]

Johnson

[11] Patent Number: 4,934,053
[45] Date of Patent: Jun. 19, 1990

[54] CULINARY IMPLEMENT SYSTEM

[76] Inventor: Nancy C. Johnson, 2427 Mark Dr., Mesquite, Tex. 75150

[21] Appl. No.: 349,597

[22] Filed: May 9, 1989

[51] Int. Cl.$^5$ .......................... B26B 1/02; B26F 3/00; A47J 43/00
[52] U.S. Cl. .................................. 30/135; 30/120.1; 30/124
[58] Field of Search ...................... 30/120.1, 124, 212, 30/261, 135

[56] References Cited

U.S. PATENT DOCUMENTS

| 359,950 | 3/1887 | Wilcox . | |
|---|---|---|---|
| 1,109,446 | 9/1914 | Melberg | 30/124 |
| 1,870,741 | 8/1932 | Mastrom | 30/124 |
| 2,549,008 | 4/1951 | Rasaka et al. . | |
| 2,726,440 | 12/1955 | Jowers . | |
| 4,106,402 | 8/1978 | Gevas | 30/120.1 |
| 4,149,456 | 4/1979 | Gisonni | 30/120.1 |
| 4,507,866 | 4/1985 | Rimmeir . | |

*Primary Examiner*—Douglas D. Watts
*Assistant Examiner*—Paul M. Heyrana
*Attorney, Agent, or Firm*—Johnson & Gibbs

[57] ABSTRACT

A culinary implement system for use with hard boiled eggs in the preparation, storage and handling of whole deviled eggs. The implement comprises a bifurcated cutter adapted for engaging the surface of a shelled hard boiled egg for cutting through to the egg yolk to facilitate its removal therefrom. In this manner a deviled egg can be made from a whole egg rather than the conventional half egg. A storage container is also provided for handling and serving a plurality of whole deviled eggs.

10 Claims, 2 Drawing Sheets

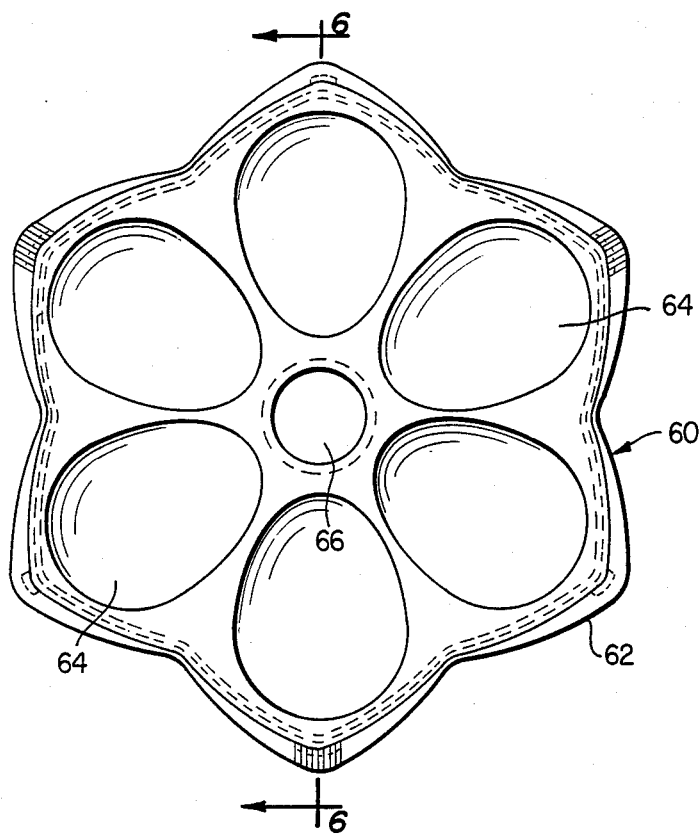
FIG. 5
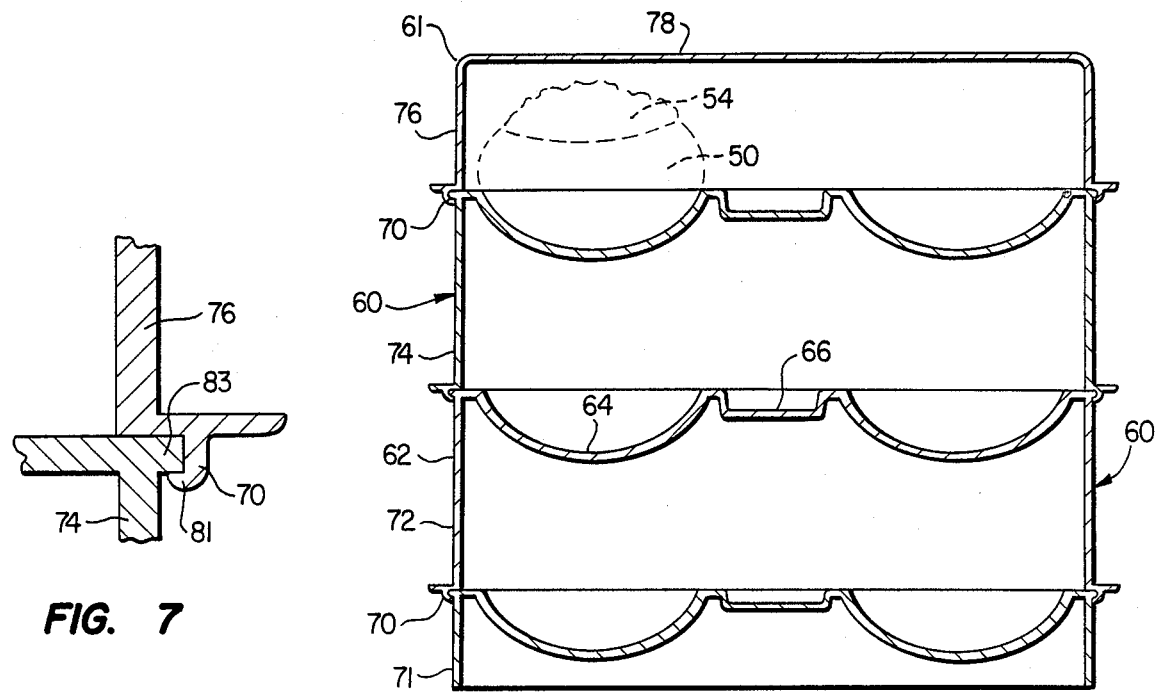
FIG. 7
FIG. 6

CULINARY IMPLEMENT SYSTEM

BACKGROUND OF THE INVENTION

1. Field of the Invention

The present invention pertains to culinary apparatus and, more particularly, to a bifurcated cutting implement adapted for cutting through the white of a hard boiled egg for removing the egg yolk therefrom and the storage and handling of whole deviled eggs.

2. History of the Prior Art

The prior art is replete with culinary implements adapted for facilitating the preparation of food as well as the enjoyment thereof. Many culinary implements have, however, manifested only slight change throughout the decades. For example, conventional silverware configurations have varied only slightly and many of these variations are attributable to advances in metallurgy. The most noticeable advance in culinary implements is the result of the application of higher technology, e.g. motorizing kitchen utensils. Blenders, mixers, processors and choppers have found widespread application in the preparation of food. In many instances the food preparation is for both aesthetic as well as functional or nutritional benefit.

More basic advances in the prior art include the development of apparatus having, as its sole function, a particular application for culinary items. The cork screw for example was necessitated by the widespread use of water tight corks and in the late 1700's a model was developed with a moving screw and fixed collar which found widespread popularity. Such prior art also includes the development of the modern fork, the distant precursors of which had been dated as far back as the sixth millennium B.C. Such utensils found widespread popularity in the 1300's and 1400's. Such culinary implements were, however, a symbol of luxury and only came into general use at the close of the eighteenth century. It was, in fact, not until this time that individual plates and glasses found themselves in general use by the general public. Prior to this time communal dishes or caldrons were used by both family and guests. It may be seen that culinary implements as well as certain cuisine, though considered a symbol of refinement for the wealthy, have over the centuries found themselves applicable to everyday dinner and public consumption. For this reason culinary implements particularly adapted for the preparation of certain foods play an important role in the development of dining habits. Certain foods such as hors d'oeuvres considered separate from conventional dining and dietary consideration can ultimately become more popular once the preparation thereof has been simplified by such developments.

The preparation of food stuff with culinary implements particularly adapted for a specific operation is represented in some instances by U.S. patent references. For example, U.S. Pat. No. 359,950 was issued to Wilcox in 1887 for facilitating the removal of kernels of corn. This implement was comprised of a bifurcated blade assembly of arcuate design. The blades were disposed in generally parallel spaced relationship to thereby form a generally circumferential cutting surface of bifurcated design. The elongate shape of the implement permitted its resilient engagement with an ear of corn in axial alignment therewith. The resiliency imparted a biased cutting pressure to the ear of corn whereby axial and/or rotational movement of the implement relative to the ear of corn would cause the removal of the kernels therefrom. This particular culinary application has obviously found widespread utility as more advanced assemblages have been provided in more recent years. Today corn is provided as a food stuff in both configurations on the ear and removed therefrom. Only by the advances in cutting technology, however, is the widespread availability for such food items made possible.

U.S. Pat. No. 2,726,440 is a 1955 patent teaching an improved means for cutting the meat from grapefruit and the like. In this particular application, a generally cylindrical shaped cutter was particularly adapted for engaging, flexing and cutting the meat of a grapefruit for the convenience of the user. The novelty found therein apparently resided in the utilization of the generally cylindrical, flexible cutting blades that were themselves separated in space one from the other for affording ease and flexibility during engagement with the particular food item. Both the size, shape and the material characteristics were particularly adapted for the application so desired. By utilization of this particular culinary implement advances were made possible in food preparation.

U.S. Pat. No. 2,549,008 issued to Rasaka in 1951 is yet another advance in food preparation made possible by a culinary implement. In this patent reference a coring implement is constructed with a depth gauge. Fruits and vegetables can therein be prepared in a more efficient manner. Were it not for such tools of the culinary trade, many of todays finer dishes would not be so readily available. Likewise, many of the foods themselves are the result of some manifestation of inventive genius.

Take for example the crescent roll. Invented in the seventeenth century in Vienna, the crescent roll represents both a time and a place. The city had been under siege by the Turks who had been defeated. It is said that a Polish entrepreneur had a baker make small milk bread rolls in the shape of crescents to commemorate the victory over the Turks to be sold with coffee at his cafe. They Were immediately successful. Similarly, cream filled bread rolls originated as a delicacy but due to the development of specialized culinary implements are more common today. For example, one culinary implement particularly adapted for the making of stuffed bread rolls is set forth and shown in U.S. Pat. No. 4,507,866 issued to Rimmeir. This 1985 reference teaches yet another device for enhancing the ease with which an individual may prepare food. This culinary implement is particularly adapted for removing the center region of a bread roll for replacing said region with a select filling. The utensil is particularly constructed for this single operation as well as for enhancing the efficiency in food preparation. The construction of the device is particularly adapted for bread wherein the cutting end of the culinary implement is of sinuous construction. A pair of arcuate serrated regions are therein permitted to engage the bread and by select motion remove said center region thereof. In this manner the bread is embedded within the implement itself. A separate aspect of the implement is the means for removing the bread therefrom.

It may be seen that the prior art is replete with apparatus for specific culinary use. None of these devices address the particular application of preparing deviled eggs from hard boiled eggs. Deviled eggs are the result of careful culinary preparation and may vary in composition and design. For example, the mixture of hard boiled egg yolk and other ingredients will vary from recipe to recipe. What does not vary in prior art recipes for deviled eggs is the utilization of one-half of the egg for each deviled egg serving. This requires that the egg be evenly cut in two and the portion thereof is substantially reduced in size. The preparation of a deviled egg from the whole egg is generally not possible due to the difficulty in removing the hard boiled egg yolk from the egg with conventional culinary implements. Yet, a deviled egg made from the whole egg would be aesthetically pleasing and considerably easier to handle as a finger food. With the curvature thereof left intact, it would be both an aesthetic advance over the prior art as well as a functional advance in the preparation of such hors d'oeuvres. The present invention addresses such a need by providing a culinary implement particularly adapted for engaging and removing a select portion of the hard boiled egg white so that the yolk can be easily removed.

SUMMARY OF THE INVENTION

The present invention relates to culinary implements particularly adapted for specific food preparation operations. More particularly, one aspect of the present invention includes a generally cylindrical cutting implement of bifurcated construction. The bifurcated construction facilitates flexing of the implement following insertion into a whole hard boiled egg. The implement is sized to engage a conventional egg and the lower cutting surface thereof is angulated to particularly engage and selectively cut away a portion of the whole hard boiled egg white, exposing the yolk for removal and creating a hollow to be filled with one's favorite deviled yolk recipe.

In another aspect of the invention, the culinary implement described above comprises a pair of oppositely disposed semicylindrical cutting sections flexibly mounted one to the other. Each section is adapted for flexing one towards the other and are each constructed with side portions comprising cutting surfaces. In this manner, flexing of the culinary implement will cause sections of the egg white not previously cut to be evenly severed for purposes of creating an aesthetically pleasing aperture in a hard boiled egg subsequent to the removal of the egg yolk therefrom. A serving tray system is also provided for storage and handling of a plurality of deviled eggs prepared from the aforesaid implement.

BRIEF DESCRIPTION OF THE DRAWINGS

For a more complete understanding of the present invention and for further objects and advantages thereof, reference may now be had to the following description taken in conjunction with the accompanying drawings and which:

FIG. 5 is a top plan view of a serving tray adapted for containing multiple deviled eggs of the type prepared in accordance with the principles of the present invention;

FIG. 6 is a side elevational, cross sectional view of a serving tray assembly constructed in accordance with the principles of the present invention for storing and serving multiple hard boiled eggs prepared in accordance with the principles of the present invention; and FIG. 7 is an enlarged side elevational, cross sectional view of the interlocking tray detail of FIG. 6.

DETAILED DESCRIPTION

Figure 1:
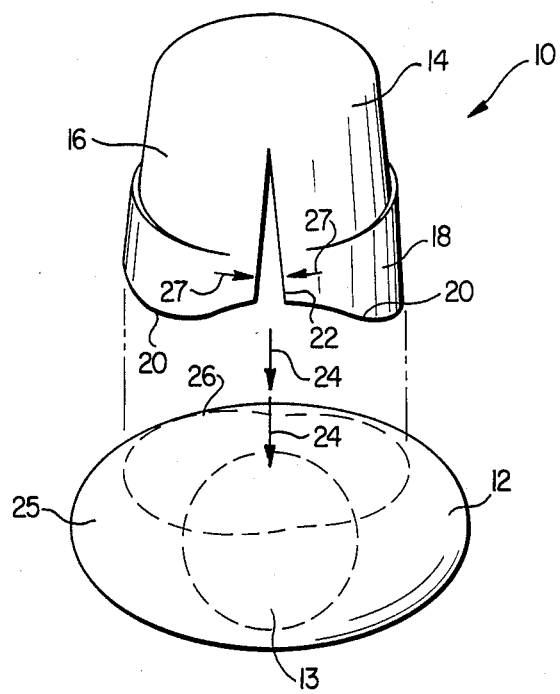
FIG. 1 is a perspective view of the culinary implement of the present invention positioned above a hard boiled egg for purposes of creating a hollow and removing the egg yolk therefrom.

Referring first to FIG. 1, there is shown a perspective view of the culinary implement 10 of the present invention poised atop a hard boiled egg 12 in a position for removing a portion of the egg white and the egg yolk 13 therefrom. The implement 10 comprises a bifurcated shell 14 including a left shell section 16 and a right shell section 18. The shell sections 16 and 18 are preferably made of plastic and both terminate across a bottom cutting region 20. The sections 16 and 18 also flex across the bifurcation slot 22 formed on opposite sides thereof. With this construction the shell 14 may be pressed downwardly the direction of arrows 24 into engagement with the surface of the egg 25 forming a cutting line therearound as shown by phantom line 26. Once the shell 14 has then penetrated the surface 25 of the egg 12, it is squeezed where flexing may occur in the direction of oppositely disposed arrows 27. The aforesaid flexing may be the result of simple pressing of the bifurcated shell 14 by the user to remove the egg white and expose the egg yolk 13. In this manner a whole hard boiled egg is prepared for receipt of deviled egg mix and an hors d'oeuvres configuration not generally possible with prior art culinary techniques.

Figure 2:
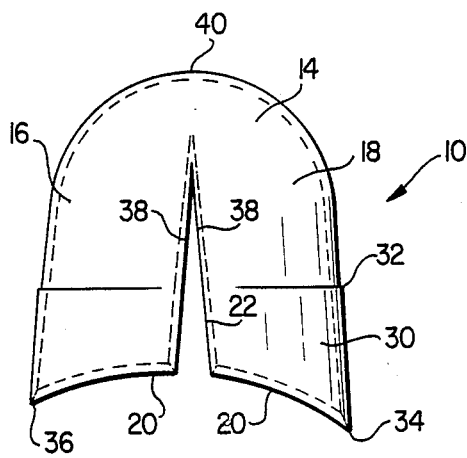
FIG. 2 is a side elevational view of the culinary implement of FIG. 1 illustrating the construction thereof.

Referring now to FIG. 2, there is shown a side elevational view of the shell 14 of FIG. 1. The shell 14 is constructed with a raised section 30 functioning as a depth gauge for the cutting implement 10. The raised section 30 is formed by enlarged side wall area in bifurcated sections 16 and 18 and terminates at an upper region across the shoulder 32. The shoulder 32 functions as a depth indicating line for the cutting implement 10 facilitating controlled penetration of the bifurcated sections 16 and 18 into the egg 12. Obviously unregulated penetration of such a cutting implement could tear the opposite side of the egg white to thereby render the egg useless for preparation of a whole deviled egg. In one embodiment, the shoulder 32 is ⅜ inch from the bottom cutting edge 34 defined below.

Referring still to FIG. 2, the cutting surface 20 of the shell 14 is specifically constructed for facilitating engagement of and cutting through the hard boiled egg white of an egg 12. In this respect, a first cutting section 34 is constructed to extend downwardly a distance slightly greater (on the order of 0.125 in.) relative to opposite cutting surface 36 of bifurcated section 16. Bifurcated section 18 is thus adapted for engaging a portion of the egg 12 for creating a penetration therein at a greater depth than bifurcated section 16. Across bifurcated slot region 22, each section 16 and 18 is formed with a cutting edge 38. Cutting edges 38 afford additional cutting ability for the implement during the compression flexing thereof which permits the implement to cut the hard boiled egg white in the requisite manner for permitting the egg yolk to be removed therefrom. This flexing occurs beneath the solid upper region 40 of the implement 10. Upper region 40 in the present embodiment is illustrated in an arc or dome configuration. It should be noted that any number of constructions are possible in accordance with the principles of the present invention, including a flat top region 40 or a handle region in place of the top section 40. A pair of handles (not shown) could easily be constructed for extending upwardly therefrom and facilitating the flexing of the bifurcated sections 16 and 18, similar to a pair of scissors or the like. In the present embodiment the thumb and fingers of the user's hand can simply push and squeeze shell 14.

Figure 3:
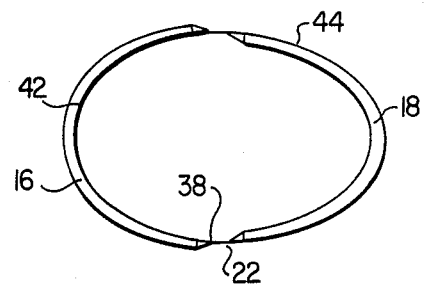
FIG. 3 is a bottom plan view of the culinary implement of FIG. 2.

Referring now to FIG. 3, there is shown a bottom plan view of the cutting implement 10. The bifurcated sections 16 and 18 are most clearly shown with the cutting edges 38 of each formed therealong. Shown most clearly in this view is, however, the mating configuration of the opposed sections 16 and 18. It may be seen that each section 16 and 18 is formed of an semielliptical cross section. The Ellipse of section 18 is slightly smaller than the ellipse of section 16 whereby section 18 may be matingly received within the side walls of section 16. The arcuate walls 44 of section 18 are thus defined by the smaller ellipse while the arcuate walls 42 of section 16 are formed by the larger ellipse. Cutting edges 38 extend along the bifurcated section for terminating the elliptical region thereof in the cutting configuration described above.

Figure 4:
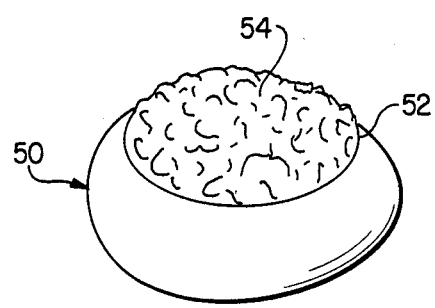
FIG. 4 is a perspective view of a hard boiled egg having the egg yolk removed therefrom and prepared into a deviled egg comprising the whole hard boiled egg.

Referring now to FIG. 4, there is shown a deviled egg 50 prepared in accordance with the principles of the present invention. The whole egg 50 is utilized for the preparation of a deviled egg whereby the top portion 52 represents the cut portion formed by the implement 10. A deviled egg mix of conventional recipe is shown protruding therefrom in mound 54. This particular configuration represents a novel hors d'oeuvre creation made possible by the particular application of the culinary implement 10 of the present invention. The preparation of such a deviled egg 50 does, however, present certain other associated considerations such as storage, transportation, and serving. In accordance therewith, another aspect of the present invention provides a serving tray assembly specifically adapted for a whole deviled egg prepared in accordance with the principles of the present invention.

Referring now to FIG. 5, there is shown a whole deviled egg service tray 60 formed in an arcuate configuration with six sides and having a plurality of generally elliptically shaped cups formed therein adapted for receiving a whole deviled egg and securely containing the egg for storage, movement and service. The shape of the tray 60 can, of course, vary and it may be made of plastic or other material facilitating such a shape. The actual size of eggs will, of course, vary and the elliptically shaped cup region 64 is provided to generally anticipate the shape of the underneath side of a whole egg for purposes of both aesthetic and functional support thereof. A central recess 66 is provided in the tray as a fabrication aspect to hold an edible garnish and to provide, in some embodiments, structural strength thereto. The tray 60 is adapted for assembly to a plurality of other trays for purposes of facilitating transportation, storage and service of whole deviled eggs prepared in accordance with the principles of the present invention.

Referring now to FIG. 6, there is shown a side elevational, cross sectional view (taken along lines 6—6 of FIG. 5) of a plurality of serving trays 60 assembled one to the other into a stacked array 61. Each tray 60 is formed with at least one latching member 70 for engaging and interlocking one tray to the other. The side wall portion of each tray extends downwardly a sufficient depth to separate the trays one from the other so as to permit a whole deviled egg to be placed therein without being effected by the upper tray. This is illustrated by the representation of egg 50, shown in phantom, and the deviled egg mix 54 protruding therefrom. Likewise the lower, middle and top trays 71, 72 and 74 respectively, are stacked one atop the other with a lid 76 thereabove. Lower tray 71 has a shorter base, as shown. Lid 76 includes a top 78, which may be clear plastic for showing the eggs 50 inside.

Referring now to FIG. 7, there is shown an enlarged side elevational, cross sectional view of one embodiment of a latching member 70 of FIG. 6. It may be seen that any number of interlocking configurations are possible in accordance with the principles of the present invention. As shown herein a finger 81 extends downwardly over a catch member 83 facilitating the interlocking therebetween. Latching finger 81 is preferably located on only three of the six "points." If all six were so constructed, it would be difficult to release the top from the one beneath it. Moreover, this particular illustration is only shown for purposes of reference, as other interlocking shapes may be likewise provided.

It is thus believed that the operation and construction of the present invention will be apparent from the foregoing description. While the method and apparatus shown or described has been characterized as being preferred it will be obvious that various changes and modifications may be made without departing from the spirit and scope of the invention as defined in the following claims.

What is claimed:

1. A culinary implement for cutting the egg white of a hard boiled egg and allowing a user to penetrate said egg white for removal of the egg yolk therefrom in facilitating the preparation of a deviled egg from the remaining whole egg section, said apparatus comprising:

a generally elliptical cutting implement having bifurcated side wall portions;

said side wall portions having an arcuate bottom region constructed with a cutting edge thereacross for facilitating the cutting of a hard boiled egg white;

said bifurcated construction comprising first and second generally elliptical side wall regions biased one to the other and permitting the flexing thereof for engagement and removal of egg white from said pierced egg; and said side wall portions of said semi-cylindrical implement being sufficiently thin for permitting engagement by the hands of a user and the flexing thereof for removal of said egg white from said egg.

2. The apparatus as set forth in claim 1 wherein said implement is elliptical in cross section having one bifurcated elliptical half being relatively smaller than a second bifurcated elliptical half, whereby said first half will be received within said second half during the flexing thereof for the removal of egg white from an egg.

3. The apparatus as set forth in claim 1 wherein said apparatus is constructed from plastic.

4. The apparatus as set forth in claim 1 wherein a first end of said elliptical bifurcated section is longer than a second end of said opposite bifurcated section for providing an implement which will penetrate into an egg at a deeper point on one side than on a second side.

5. The apparatus as set forth in claim 1 wherein said apparatus includes a shoulder region formed a defined distance around said elliptical bifurcated sections for providing visual evidence of penetration depth into said egg.

6. The apparatus as set forth claim 5 wherein said shoulder region of said elliptical bifurcated sections is formed at approximately ⅜" from the bottom cutting edge therearound.

7. The apparatus as set forth in claim 6 wherein said shoulder region is constructed in said bifurcated elliptical sections by an enlarged region thereof having thicker side wall portions comprising said semi-cylindrical bifurcated side walls.

8. The apparatus as set forth in claim 1 wherein said elliptical bifurcated side wall portions are joined together at an upper region thereof by an arcuate top region.

9. The apparatus as set forth in claim wherein said bifurcated section of said elliptical side wall portions extends at least 50% of said side wall portion and being thereby joined together across the upper region thereof for flexing therebelow.

10. A method of removing a section of egg white of a hard boiled egg by the penetration of the hard boiled white section of the egg to expose the egg yolk therewithin comprising the steps of:
   providing a cutting implement for the penetration of said egg and the exposure of said egg yolk therein;
   forming said implement with semi-cylindrical bifurcated side wall portions;
   providing said bifurcated side wall portions in a generally elliptical cross sectional configuration with a lower cutting edge formed thereacross and adapted for engaging and penetrating the white of said egg;
   positioning said elliptically shaped cutting sections upon the surface of a hard boiled egg;
   pressing said implement into said egg;
   flexing said bifurcated sections one toward the other for engaging said penetrated egg white of said egg therebetween; and
   retracting said implement from said egg and removing the penetrated egg white therefrom for subsequent refilling of said egg with a mixture for comprising a deviled egg.

* * * * *